Jan. 2, 1923.
E. BECKER.
FLOUR SIFTER.
FILED SEPT. 26, 1922.
1,440,861
2 SHEETS-SHEET 1
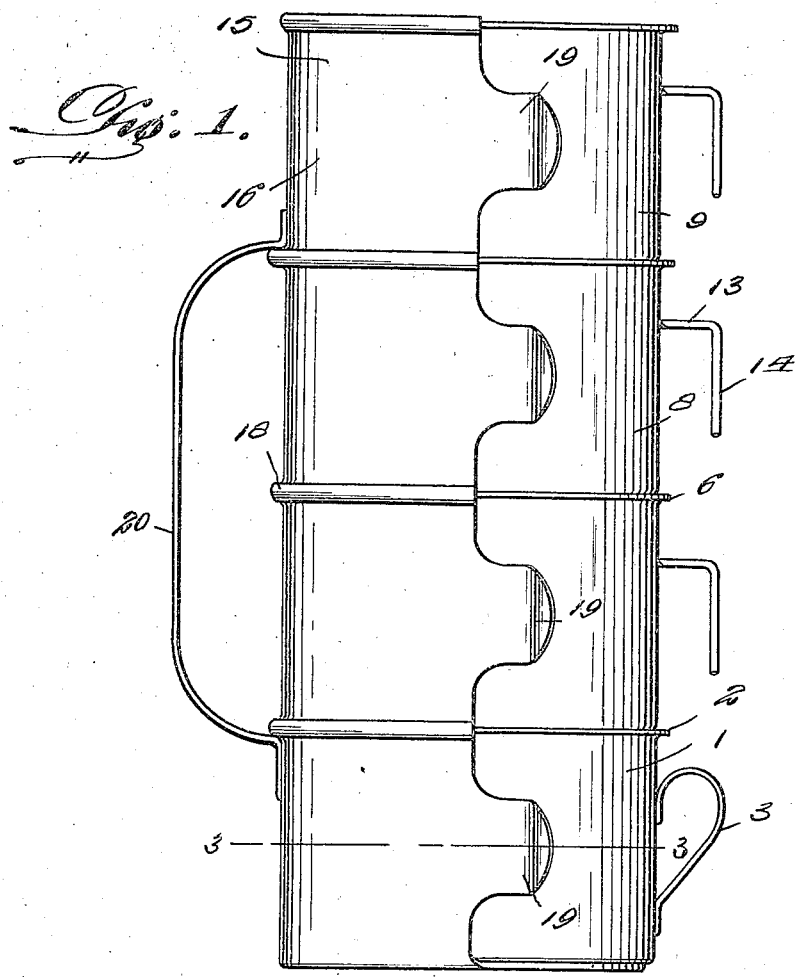
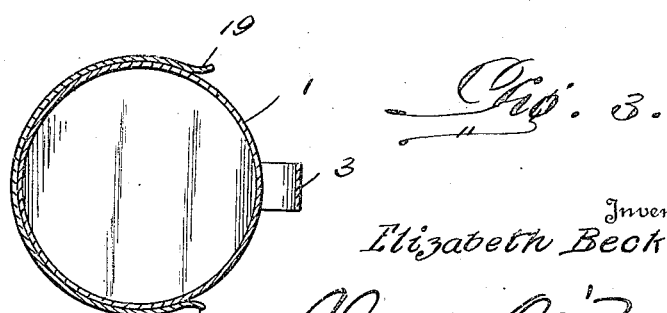
Witnesses:
F. L. Fox,
N. Berman
Inventor
Elizabeth Becker,
By Clarence O'Brien
Attorney Jan. 2, 1923.
E. BECKER.
FLOUR SIFTER.
FILED SEPT. 26, 1922.
1,440,861
2 SHEETS-SHEET 2
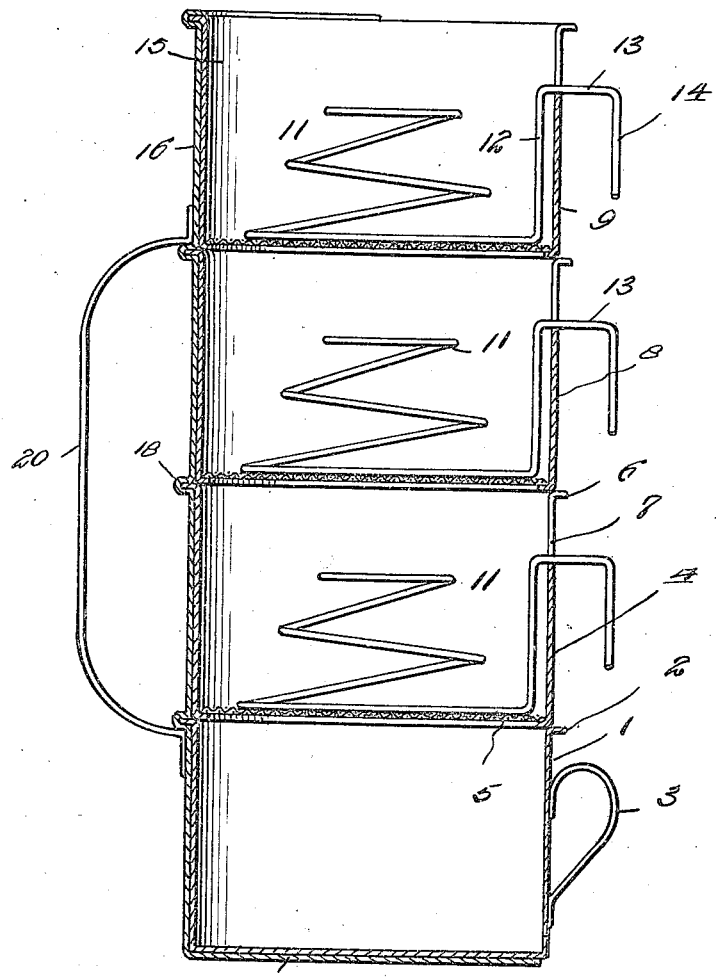
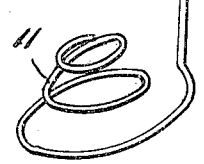
Witnesses:
F. L. Fox
N. Berman
Inventor
Elizabeth Becker,
By Clarence A. O'Brien
Attorney Patented Jan. 2, 1923.

1,440,861

UNITED STATES PATENT OFFICE.

ELIZABETH BECKER, OF DAYTON, OHIO.

FLOUR SIFTER.

Application filed September 26, 1922. Serial No. 590,577.

*To all whom it may concern:*

Be it known that I, ELIZABETH BECKER, a citizen of the United States, residing at Dayton, in the county of Montgomery and State of Ohio, have invented new and useful Improvements in Flour Sifters, of which the following is a specification.

In carrying out the present invention it is my purpose to provide a flour sifter which will be constructed in such manner that the flour may be sifted through a number of screens in one operation, thereby enabling the flour to be reduced to the desired fineness and lightness in a minimum time.

It is also my purpose to improve and simplify the general construction of flour sifters and to provide a flour sifter which will embody comparatively few parts, and these so arranged and correlated as to reduce the possibility of derangement to a minimum and at the same time permit the renewal or replacement of the screens when worn or broken.

With the above recited objects in view, and others of a similar nature, the invention resides in the construction, combination and arrangement of parts set forth in and falling within the scope of the appended claims.

In the accompanying drawings:

Figure 1 is a view in side elevation of a flour sifter constructed in accordance with my invention.

Figure 2 is a vertical sectional view through the sifter.

Figure 3 is a cross sectional view on the line 3—3 of Figure 1.

Figure 4 is a detail perspective view of one of the agitators.

Referring now to the drawings in detail, 1 designates a cup-shaped receptacle cylindrical in cross section, having a solid bottom and an open top and a side wall at the top formed with an outwardly extending flange 2, the cup being equipped with a handle 3. Mounted upon the cup and resting upon the open end thereof is a cup-shaped receptacle 4 having its lower end closed by a screen 5 and its upper end open and formed with an outwardly extending flange 6, the side walls of the cup 4 being formed with slots 7 extending from the top edge of such wall a short distance downwardly.

Mounted upon the cup shaped receptacle 4 are similarly-shaped receptacles 8 and 9 which are also mounted upon each other. These receptacles 8 and 9 are identical in construction to the construction of the receptacle 4, and therefore a further detailed description of the receptacles 8 and 9 is believed unnecessary.

Within each receptacle 4, 8 and 9, and resting upon the screen in the bottom thereof is an agitator 10 which comprises in the present instance a cone-shaped convoluted wire having the terminus at the bottom end extended upwardly, as at 12, thence outwardly, as at 13, through the slot 7 and then downwardly, as at 14, so as to provide a handle whereby the agitator may be reciprocated by the fingers of the user, if desired or necessary.

These receptacles 1, 4, 8 and 9 placed one upon the other, as shown in Figures 1 and 2 of the drawings, are held in proper relative positions and in sifter formation by the jacket 15 which comprises a semi-cylindrical shell 16 of a height equal to the combined heights of the receptacles and formed with a bottom 17 on which the bottom receptacle 1 rests. The shell 16 at points in its height corresponding to the positions of the flanges 2 on the receptacles 1, 4, 8 and 9, is formed to provide beads 18 that receive the flanges 1, as clearly shown in Figure 2 of the drawings, and the vertical edges of the semi-cylindrical shell are formed with outwardly extending spring fingers 19 that embrace the sides of the respective receptacles in order to clamp the receptacles firmly within the shell. The shell is also equipped with a handle 20.

In practice, the receptacles are assembled one upon the other, as shown in Figures 1 and 2 of the drawings, within the shell 16 and are held within the shell by means of the spring fingers 19, the flanges 2 fitting into the receptacle beads 18. The flour is now poured into the topmost receptacle and the sifter as a unit shaken, so that the agitators 10 within the respective receptacles will be moved in order to assist the flour in flowing from one receptacle to the other, and so on through the series of receptacles into the bottom receptacle 1, from which the sifted flour may be withdrawn.

I have entered into a detailed description of the construction and relative arrangement of parts embraced in the present and preferred embodiment of my invention with a view to imparting a full, clear and exact understanding of the said embodiment. I do not desire, however, to be understood as confining myself to the said specific construction and relative arrangement of parts, inasmuch as in the future practice of my invention such changes or modifications may be made as fairly fall within the scope of my invention as defined by my appended claims.

Having thus described the invention, what is claimed as new, is:—

1. A flour sifter comprising a plurality of receptacles placed one upon another, the bottom receptacle having a solid bottom and the remaining receptacles having screened bottoms, respectively, and a jacket comprising a shell formed with a bottom and adapted to hold said receptacles, and agitators within said screened bottomed receptacles, respectively.

2. A flour sifter comprising a plurality of receptacles placed one upon another, the bottom receptacle having a solid bottom and the remaining receptacles having screened bottoms, respectively, a jacket comprising a shell formed with a bottom and adapted to hold said receptacles, agitators within said screened bottomed receptacles, respectively, and spring fingers integral with said shell and embracing said receptacles, respectively, to hold the latter in proper relative positions within the shell.

3. A flour sifter comprising a plurality of receptacles placed one upon another, the bottom receptacle having a solid bottom and the remaining receptacles having screened bottoms, respectively, a jacket comprising a shell formed with a bottom and adapted to hold said receptacles, agitators within said screened bottomed receptacles, respectively, each agitator comprising a cone-shaped convoluted wire having its bottom terminus formed with upward and outward extensions fitting into slots formed respectively in said container.

4. A flour sifter comprising a plurality of receptacles placed one upon another, the bottom receptacle having a solid bottom and the remaining receptacles having screened bottoms, respectively, a jacket comprising a shell formed with a bottom and adapted to hold said receptacles, agitators within said screened bottomed receptacles, respectively, the upper end of each container being formed with an outwardly projecting flange and beads formed on said jacket corresponding in positions, respectively, to said flanges to receive the latter.

In testimony whereof I affix my signature.

ELIZABETH BECKER.